| | | DECIMAL | BINARY |
|---|---|---|---|
| OPERATING NUMBERS | x | = 2 9 5 7 | = 0 1 0 1 1 1 0 0 0 1 1 0 1 |
| | y | = 3 4 2 3 | = 0 1 1 0 1 0 1 0 1 1 1 1 1 |
| CARRY | c | 1 0 1 0 | 1 1 1 1 0 0 0 1 1 1 1 1 0 |
| SUM | x + y | = 6 3 8 0 | = 1 1 0 0 0 1 1 1 0 1 1 0 0 |

FIG. 1

$$c_{i,i+1} = x_i\, y_i\, \bar{c}_{i-1,i} \bigvee (x_i \vee y_i)\, c_{i-1,i} \equiv p_i\, \bar{c}_{i-1,i} \bigvee \bar{q}_i\, c_{i-1,i}$$

$$s_i = (x_i\, \bar{y}_i \vee \bar{x}_i\, y_i)\, \bar{c}_{i-1,i} \bigvee (x_i\, y_i \vee \bar{x}_i\, \bar{y}_i)\, c_{i-1,i} \equiv r_i\, \bar{c}_{i-1,i} \bigvee \bar{r}_i\, c_{i-1,i}$$

$$p_i = x_i\, y_i \qquad q_i = \bar{x}_i\, \bar{y}_i \qquad r_i = x_i\, \bar{y}_i \vee \bar{x}_i\, y_i = \bar{p}_i\, \bar{q}_i$$

$$\bar{p}_i = \bar{x}_i \vee \bar{y}_i \qquad \bar{q}_i = x_i \vee y_i \qquad \bar{r}_i = x_i\, y_i \vee \bar{x}_i\, \bar{y}_i = p_i \vee q_i$$

FIG. 2

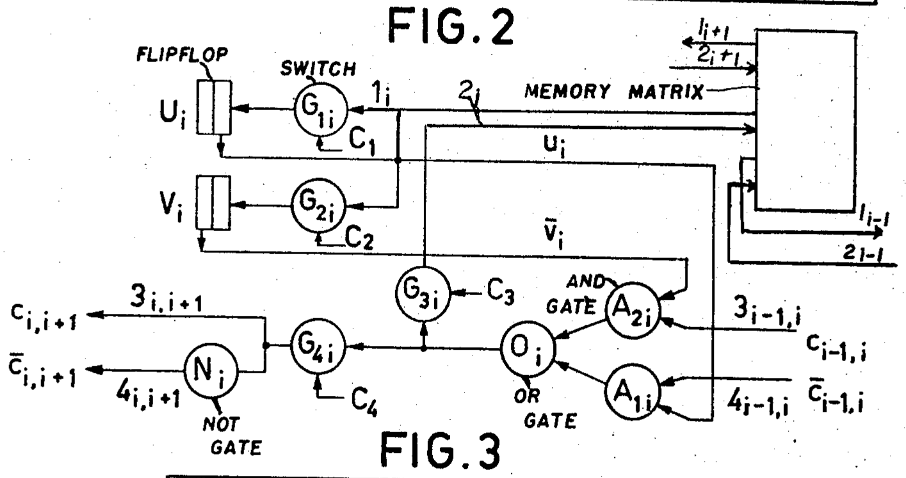

FIG. 3

| x | $c_{i-1,i}$ | $\bar{c}_{i-1,i}$ | $c_{i,i+1}$ | $\bar{c}_{i,i+1}$ |
|---|---|---|---|---|
| 1 | 1 | 0 | 0 | 1 |
| 1 | 0 | 1 | 1 | 0 |
| 0 | 1 | 0 | 1 | 0 |
| 0 | 0 | 1 | 0 | 1 |

FIG. 6

INVENTOR.
HERMAN J. HEIJN
BY
[signature]
AGENT

| l | RW | 0' | 0'' | 1' | 1'' | 2' | 2'' | 3' | 3'' | 4' | 4'' |
|---|---|---|---|---|---|---|---|---|---|---|---|
| 1 | (1,1) | $x_i$ | $x_i$ | — | $x_i$ | $x_i$ | $x_i$ | $x_i$ | $x_i$ | $x_i$ | $x_i$ |
| 2 | (1,1) | $y_i$ | $y_i$ | $y_i$ | $y_i$ | — | $y_i$ | $y_i$ | $y_i$ | $y_i$ | $y_i$ |
| 3 | (1,1) | — | — | — | $x_i$ | $x_i$ | $\bar{q}_i$ | $\bar{q}_i$ | $\bar{q}_i$ | — | — |
| 4 | (1,0) | — | — | — | $\bar{x}_i$ | $\bar{x}_i$ | $\bar{p}_i$ | — | $p_i$ | $p_i$ | $p_i$ |
| 5 | (1,0) | — | — | — | — | — | — | — | — | — | $q_i$ |
| | $U_i$ | — | — | $x_i$ | $x_i$ | $y_i$ | $y_i$ | $\bar{p}_i$ | $\bar{p}_i$ | $\bar{q}_i$ | $\bar{q}_i$ |
| | $V_i$ | — | — | — | — | — | — | — | — | — | — |
| | P | — | — | $C_1$ | $C_3$ | $C_1$ | $C_3$ | $C_1$ | $C_3$ | $C_1$ | $C_3$ |

| l | RW | 0 | 1 | 2 | 3 | 4 |
|---|---|---|---|---|---|---|
| 1 | (1,1) | x | x | x | x | x |
| 2 | (1,1) | y | y | y | y | y |
| 3 | (1,1) | — | x | $\bar{q}$ | $\bar{q}$ | — |
| 4 | (1,0) | — | $\bar{x}$ | $\bar{p}$ | p | p |
| 5 | (1,0) | — | — | — | — | q |
| | $U_i$ | — | x | y | $\bar{p}$ | $\bar{q}$ |
| | $V_i$ | — | — | — | — | — |

FIG. 4

| l | RW | 0 | 1 | 2 | 3 | 4 | 5 | 6 | 7 | 8 | 9 | 10 | 11 |
|---|---|---|---|---|---|---|---|---|---|---|---|---|---|
| 1 | (1,1) | x | x | x | x | x | x | x | x | x | x | x | x |
| 2 | (1,1) | y | y | y | y | y | y | y | y | y | y | y | y |
| 3 | (1,1) | — | x | $\bar{q}$ | $\bar{q}$ | — | q | $\bar{r}$ | $\bar{r}$ | $\bar{r}$ | — | $r\bar{c}$ | s |
| 4 | (1,0) | — | $\bar{x}$ | $\bar{p}$ | p | p | p | — | — | — | — | — | — |
| 5 | (1,0) | — | — | — | — | q | — | — | — | — | — | — | — |
| 6 | (1,1) | — | — | — | — | — | q | q | — | — | — | — | — |
| 7 | (0,1) | — | — | — | — | — | — | — | — | c | $\bar{r}Vc$ | — | — |
| 8 | (0,0) | — | — | — | — | — | — | — | — | $\bar{c}$ | $rV\bar{c}$ | $rV\bar{c}$ | — |
| | U | — | x | y | $\bar{p}$ | $\bar{q}$ | q | p | p | p | $\bar{r}$ | $r\bar{c}$ | $\bar{r}c$ |
| | V | — | — | — | — | — | — | — | q | q | q | q | q |

FIG. 5

INVENTOR.
HERMAN J. HEIJN
BY
AGENT 3,369,110

ARITHMETIC CIRCUIT FOR SIMULTANEOUS GENERATION OF SUM AND CARRY SIGNALS

Herman Jacob Heijn, Emmasingel, Eindhoven, Netherlands, assignor to North American Philips Company, Inc., New York, N.Y., a corporation of Delaware Filed Apr. 7, 1964, Ser. No. 358,010
Claims priority, application Netherlands, Apr. 19, 1963, 291,754
4 Claims. (Cl. 235—175)

In U.S. Patent 3,210,735 is disclosed how the logical connections "not," "or" and "and" and hence all the connections of the bivalent logic can be obtained with the aid of annular storage cores of a material having a rectangular magnetic hysteresis loop. In the said patent it is also stated that, at least in theory, it is not necessary to decompose logical connections of three or more variables into combinations of the above-mentioned logical operations, although for practical reasons this will usually be desirable or necessary for operations involving four or more variables. The said patent includes a table indicating how the ideas referred to can be realized for functions of one, two or three variables.

In the said patent there are described two examples of a computer which utilize the ideas above referred to. The computers concerned comprise substantially a matrix of storage cores provided with comparatively simple peripheral equipment and include one or more pulse generators for each row and a storage element in the form of a flip-flop or the like for each column.

Such computers have the disadvantage of slow speed when considered from an electronic standpoint. This is not attributable to the comparatively low speed of the storage cores but to the logic used. In fact, it is in the nature of the system described in the said patent that each addition is carried out as a series-process, that is to say digit position after digit position, while the calculation takes six or more basic time intervals or clock-pulse phases for each digit position.

It is the object of the present invention to obviate this disadvantage. This is achieved in that in every digit position the operations which have to be carried out with the digits of the numbers to be added together are carried out. Simultaneously by means of the peripheral equipment in the storage matrix, operations which are not dependent on the results of the operations at other digit positions, are carried out in a logical circuit common to the columns of the matrix. In the case of an addition of two numbers such is the case, for example, with the carry.

It has already been stated hereinbefore that the peripheral equipment for carrying out logical operations in the columns of the matrix independently of the results of the operations in other columns is comparatively very simple. The technical importance of the idea above set out resides in the fact that only a small extension renders the said equipment suitable for carrying out operations which have to be effected as a series-process. The use of this idea makes it possible to construct a computer, while not of ultra-high speed, at least comparatively simple and hence inexpensive. Such a machine can carry out an addition or subtraction of two numbers having about 10 decimal digit positions (corresponding to about 37 binary digit positions) within one ten thousandth of a second and a multiplication or division of two such numbers within one thousandth of a second. Such speeds are more than sufficient for numerous uses, for example, computers of the so-called table type.

In order that the invention may be readily carried into effect, one embodiment thereof will now be described in detail, by way of example, with reference to the accompanying diagrammatic drawings. The embodiment relates to a machine calculating in the binary system but this restriction is not essential. The important point is that all the operations which are not dependent on the results of operations at other digit positions are carired out simultaneously, and in phase, in the storage matrix for all the digit positions and that those operations which must necessarily be carried out sequentially take place in a separate logical circuit obtained by extension of the peripheral equipment which is present already for other reasons. This requires the operations to be decomposed into one set of operations to be carried out simultaneously and another set of operations to be carried out sequentially, a problem which lies wholly in the mathematic logical field and will rarely meet with difficulties, although it is not always easy to find the optimum division.

FIGURE 1 shows, in tabular form, the manner in which, according to the invention, the sum of two numbers written in binary form is found;

FIGURE 2 shows, likewise in tabular form, a survey of the Boolean-algebraic formulae used;

FIGURE 3 shows a block diagram of one portion of the peripheral equipment of a storage matrix which relates to a single digit position in accordance with the invention;

FIGURES 4, 5 and 6 show tables which serve to explain the operation of this embodiment.

In FIGURE 1 it is illustrated in which manner the numbers $x=2957$ and $y=3423$ are added in a computer according to the invention. It appears that the carries or transfers which have to be handled at the four decimal digit positions of these numbers are 0, 1, 0 and 1 respectively (when counting the digit positions from the right to the left). These transfers are shown in FIGURE 1 in line $c$ at the digit positions where they have to be handled, at the digit position to the left of the digit position where the relevant transfer is produced. The digits $s_0$, $s_1$, $s_2$ and $s_3$ of the sum $s=x+y$ of the two numbers $x$ and $y$ are found by calculating, at each digit position, the sum modulo 10 of the relevant digits $x_i$ and $y_i$ of the numbers $x$ and $y$ and the transfer $c_{i-1,i}$ to be handled at this digit position.

FIGURE 1 also shows the bivalent equivalent of this calculation of the sum of the numbers $x$ and $y$.

FIGURE 2 shows the Boolean-algebraic formulae underlying the embodiment of the invention explained in detail hereinafter, as well as the importance of the auxiliary variables $p_i$, $q_i$ and $r_i$ used therein. The latter magnitudes are to be regarded as abbreviations for the Boolean-algebraic functions shown in FIGURE 2. The correctness of these formulae can immediately be verified by writing the eight possible cases which may occur in the addition modulo 2 of three binary digits (0 or 1). See therefor, for example, R. Serell, Elements of Boolean Algebra for the Study of Information-Handling Systems (P.I.R.E., vol. 41, 1953, pages 1366 to 1380).

FIGURE 3 shows a block diagram of the portion of the peripheral equipment relating to a single digit position (or column), for the columns of the storage matrix (not shown) of a computer in which the invention is used. This portion is connected through two wires $1_i$ and $2_i$ to the storage elements of a column of the storage matrix. Let it be assumed that the storage elements are storage cores, but this assumption is not essential. The illustrated portion of the peripheral equipment is connected through two wires $3_{i-1,i}$ and $4_{i-1,i}$ to the corresponding portion of the peripheral equipment for the preceding digit position and through two wires $3_{i,i+1}$ and $4_{i,i+1}$ to the corresponding portion of the peripheral equipment for the succeeding digit position. The wire $1_i$ serves to lead a signal from the matrix to the relevant portion of the peripheral equipment and the wire $2_i$ to lead a signal in the opposite sense. The signals in the wires $1_i$ and $2_i$ consist in the presence or absence of a pulse. The wires $3_{i-1,i}$ and $4_{i-1,i}$ serve to transport a signal $c_{i-1,i}$ produced in the preceding part of the peripheral equipment (which signal need not necessarily have the signification of a carry) to the illustrated portion of the peripheral equipment and the wires $3_{i,i+1}$ and $4_{i,i+1}$ serve to transport a signal $c_{i,i+1}$ produced in this portion of the peripheral equipment to the succeeding part thereof. The signals in the wires $3_{i-1,i}$ and $4_{i-1,i}$ are direct voltages or direct currents such that the voltages or currents for the same value of the subscript $i$ are always different in two wires $3_{i-1,i}$ and $4_{i-1,i}$, these voltages or currents interchanging when the value of the relevant signal changes from 0 to 1 or conversely.

The circuit shown shown in FIGURE 3 comprises two flip-flops $U_i$ and $V_i$, two and-gates $A_{1i}$ and $A_{2i}$, an or-gate $O_i$, a not-gate $N_i$ and four gates $G_{1i}$, $G_{2i}$, $G_{3i}$ and $G_{4i}$ which serve as switches. These elements are interconnected in the manner shown in FIGURE 3. The gates $G_{1i}$, $G_{2i}$, $G_{3i}$ and $G_{4i}$ may be temporarily opened by the control circuit (not shown) by supplying control pulses $C_1$, $C_2$, $C_3$ and $C_4$. If desired, the said gates may be made manually controllable, although this will seldom be practical.

Since each function of the three variables $x_i$, $y_i$ and $c_{i-1,i}$ can be written in the form $u_i\bar{c}_{i-1,i}+\bar{v}_ic_{i-1,i}$, where $u_i$ and $v_i$ are two functions of $x_i$ and $y_i$, the or-gate $O_i$ can deliver each function of $x_i$, $y_i$ and $c_{i-1,i}$ for which purpose the relevant functions $u_i$ and $v_i$ can be written in the flip-flops $U_i$ and $V_i$. In the patent referred to above, it is disclosed that this is the case for all the functions of $x_i$ and $y_i$ so that it is possible to form every function of $x_i$, $y_i$ and $c_{i-1,i}$ at the output of the or-gate $O_i$. This makes it possible to produce the carries in the peripheral equipment for the columns for all the digit positions sequentially and this as well for the addition as for the subtraction and independently of the fact whether or not an end-around carry is used. For this purpose it is necessary only previously to store the suitable signals in the flip-flops $U_i$ and $V_i$ and then to open all the gates $G_{4i}$ so that the carry can propagate over all the digit positions of the peripheral equipment. When using diode circuits for the or-, and- and not-gates, the carry may be formed at all the digit positions of a computer member having 40 binary digit positions (corresponding to about 12 decimal digit positions) within one microsecond. The transfers carries formed in the peripheral equipment for the columns can be written in the storage matrix by opening the gates $G_{3i}$. The wires $2_i$ are preferably connected to the storage elements of the columns of the storage matrix so that each carry is written in the column in which it has to be handled. The manner in which this may be effected is described in the patent repeatedly referred to above.

All the gates $G_{4i}$ being closed, the wire $3_{i-1,i}$ conveys a signal which is interpreted by the end-gate $A_{2i}$ as a signal of the value 0 and the wire $4_{i-1,i}$ conveys a signal which is interpreted by the and-gate $A_{1i}$ as a signal of the value 1. All the and-gates $A_{2i}$ now supply output signals of the value 0 whereas the and-gates $A_{1i}$ supply output signals of the same value as the signals stored in the corresponding flip-flops $U_i$. The signals stored in the flip-flops $U_i$ may be transferred to one or more rows, specially indicated in the storage matrix, by keeping all the gates $G_{4i}$ closed and opening all the gates $G_{3i}$. If the storage elements of the storage matrix are storage cores this may be effected, as is well-known, in a very simple manner by using the coincidence principle.

It will now be described in detail in which manner the sum $s$ of two numbers $x$ and $y$ may be formed with the equipment described. In this connection it is to be noted, however, that the difference $v$ of two numbers may be formed in an analogous manner.

To permit the use of the method of calculating illustrated in FIGURE 1, it is necessary first to produce signals identified with the carries. To this end, the signals $p_i=x_iy_i$ and $q_i=\bar{x}_i\bar{y}_i$ ($i$ is the serial number of the relevant digit position) must be formed in accordance with the formulae given in FIGURE 2. The table in FIGURE 4 illustrates in which manner this may be effected.

For the process concerned use is made of five rows of the storage matrix, namely the rows 1, 2, 3, 4 and 5. In FIGURE 4 the number of each row is found in the column 1.

Not all the rows of the storage matrix are coupled to the peripheral equipment in the same manner and the way in which this coupling takes place is shown for each row separately by the symbol $(\alpha, \beta)$ specified in the read-write column RW, where each of the two Greek characters $\alpha$ and $\beta$ may be 1 or 0. The signals stored in a row for which $\alpha=1$, upon reading such a row for the use of the peripheral equipment for the columns, are led to this peripheral equipment in uncomplemented form. This is intended to mean that, if a signal of the value 1 is stored at a given digit position of such a row, upon reading this row, a signal which is treated as a signal of the value 1 for the further handling is stored in the flip-flop $U_i$ or $V_i$ (dependent on whether the gates $G_{1i}$ or the gates $G_{2i}$ are temporarily opened) and that, if a signal of the value 0 is stored at this digit position, upon reading this row, a signal which is treated as a signal of the value 0 for the further handling is stored in the flip-flop $U_i$ or $V_i$. The signals stored in a row for which $\alpha=0$, upon reading such a row for the use of the peripheral equipment for the columns, are transferred to this peripheral equipment in complemented form. This is intended to mean that, if a signal of the value 1 is stored at a given digit position of such a row, upon reading this row, a signal which is treated as a signal of the value 0, for the further handling is stored in the flip-flop $U_i$ or $V_i$ (again dependent on whether the gates $G_{1i}$ or the gates $G_{2i}$ are transiently opened) and conversely.

The signals present in the wires $2_i$ are stored in uncomplemented form in a row for which $\beta=1$ and these signals are stored in complemented form in a row for which $\beta=0$, which must naturally be interpreted in the above-mentioned sense. If the storage elements are so-called storage cores the above result may be achieved by threading the reading wires in a suitable manner through the rows of the storage matrix and threading the writing wires $2_i$ in a suitable manner through the columns of the storage matrix.

The circuit is controlled by pulses supplied by the control circuit and which may occur at two phases of the clock pulse cycles. A transport of signals from the storage matrix to the peripheral equipment for the columns can take place only during the phase 1 of a clock-pulse cycle (indicated by one accent in FIGURE 4) and a transport of signals in the opposite sense can take place only during the phase 2 of a clock-pulse cycle (indicated by a double accent in FIGURE 4). Signals are written or stored in the storage matrix preferably by using the so-called coincidence principle. This makes it possible for the signals present in the wires $2_i$ to be stored in rows specially indicated of the matrix and this in uncomplemented form for the rows for which $\beta=1$ and in complemented form for the rows for which $\beta=0$. A row of the storage matrix can be read without the use of the coincidence principle.

The signals $p_i=x_iy_i$ and $q_i=\bar{x}_i\bar{y}_i$ may be formed as follows: During the $0^{th}$ pulse cycle and hence at the beginning of this operation, the first and second rows contain the signals $x_i$ and $y_i$ and all the other rows entering into account are empty, that is to say the storage cores of the row for which $\alpha=1$ are in the position 0 and the storage cores of the rows for which $\alpha=0$ are in the position 1. During the first phase of the first pulse cycle, the row 1 is read and the signals stored in this row are thus transferred to the flip-flops $U_i$ in uncomplemented form. For this purpose it is necessary to open temporarily the gates $G_{1i}$ during this phase (presence of the pulse $C_1$). During the second phase of the first pulse cycle, the signals stored in the flip-flops $U_i$ are transferred to the rows 1, 3 and 4 of the storage matrix which thus contain the signals $x_i$, $x_i$ and $\bar{x}_i$. It is necessary therefore that, during this phase, all the gates $G_{3i}$ are temporarily opened but all the gates $G_{4i}$ remain closed (presence of the pulse $C_3$ but absence of the pulse $C_4$). During the first phase of the second pulse cycle, the row 2 is read and the signals stored in this row are transferred to the flip-flops $U_i$ (gates $G_{1i}$ open). During the second phase of the second pulse cycle, the signals stored in the flip-flops $U_i$ are transferred to the rows 2, 3 and 4 of the storage matrix (gates $G_{3i}$ open but gates $G_{4i}$ closed). The signals $y_i$ are thus rewritten in the row 2. Since the row 3 already contained the signals $x_i$, this row contains the signals $x_i \vee y_i = \bar{q}_i$ after the end of the second clock pulse cycle. Since the row 4 already contained the signals $\bar{x}_i$, this row contains the signals $\bar{x}_i \vee \bar{y}_i = \bar{p}_i$ after the end of the second clock pulse cycle. The signals $\bar{p}_i$ stored in the row 4 are transferred to the flip-flops $U_i$ in uncomplemented form during the first phase of the third cycle of clock pulses and the signals $\bar{p}_i$ stored in the flip-flops $U_i$ are supplied back to the row 4 in complemented form during the second phase of the third cycle of clock pulses, so that this row contains the signals $p_i$ after the end of the third cycle of clock pulses. The signals $\bar{q}_i$ stored in the row 3 are transferred to the flip-flops $U_i$ in uncomplemented form during the first phase of the fourth clock pulse cycle and the signals stored in the flip-flops $U_i$ are transferred to the row 5 in complemented form during the second phase of the fourth clock pulse cycle, so that this row contains the signals $q_i$ after the end of the fourth clock pulse cycle. The process above described can be followed step by step in the left-hand part of FIGURE 4. The right-hand part of this figure is an abbreviated notation for the same.

FIGURE 5 illustrates, with the use of this abbreviated notation, in which manner the sum $s$ of two numbers $x$ and $y$ may be formed in eleven cycles of clock pulses. The first four clock pulse cycles are used to form the signals $p_i$ and $q_i$ in the manner just described. During the clock pulse cycle 5, the signal $q_i$ is transferred from the row 5 to the rows 3 and 6. During the clock pulse cycle 6, the signal $p_i$ is transferred from the row 4 to the row 3 which thus now contains the signal $p_i \vee q_i = \bar{r}_i$. Of the clock-pulse cycle 7 only the reading phase is used to transfer the signal $q_i$ from the row 6 to the flip-flop $V_i$. So the flip-flops $U_i$ and $V_i$ now contain the signals $p_i$ and $q_i$. The writing phase of the clock-pulse cycle 7 and the reading phase of the clock-pulse cycle 8 are used to enable the carry to propagate over all the digit positions. For this purpose the final part of the reading phase of clock-pulse cycle 7 may possibly be sufficient which would save one clock-pulse cycle. The writing-phase of the clock-pulse cycle 8 is used to write the carry $c_{i-1,i}$ formed in the meantime, in uncomplemented form in the row 7 and in complemented form in the row 8. During the clock-pulse cycle 9, the signal $\bar{r}_i$ of row 3 is transferred in uncomplemented form to the row 7 and in complemented form to the row 8, which rows thus now contain the signals $\bar{r}_i \vee c_{i-1,i}$ and $r_i \vee \bar{c}_{i-1,i}$. During the clock-pulse cycle 10, the signal $\bar{r}_i \vee \bar{c}_{i-1,i}$ is transferred in complemented form from the row 7 to the row 3, which thus contains the signal $\overline{\bar{r}_i \vee c_{i-1,i}} = r_i \bar{c}_{i-1,i}$. During the clock-pulse phase 11, the signal $r_i \vee \bar{c}_{i-1,i}$ is transferred in complemented form from the row 8 to row 3, which thus contains the signal $$r_i \bar{c}_{i-1,i} \vee \overline{r_i \vee \bar{c}_{i-1,i}} = r_i c_{i-1,i} \vee \bar{r}_i c_{i-1,i} = s_i$$

The addition is thus completed.

Summarizing the foregoing example, the following sequence describes the summation operation:

(1) Read: $x_i$ (Row 1) to $U_i$ (Gate $G_{1i}$ opened).
Write: $U_i$ signal ($x_i$) to Rows 1, 2, and $\bar{4}$ (gates $3_i$ open, $4_i$ closed). (The "not" sign over a row number will be used to signify that a transfer has has been made in its complement.) Here, this means that $x_i$ has been written in Rows 1 and 3, while $\bar{x}_i$ in Row 4. In FIG. 4, the "RW" column contains this complementing information.

(2) Read: $y_i$ (Row 2) to $U_i$ (Gate $G_{1i}$ open).
Write: $U_i$ ($y_i$) to Rows 2, 3, $\bar{4}$. As a result $y_i$ is written in Row 2; $x_i \vee y_i$ is formed in Row 3 ($\bar{q}_i$), and since $\bar{x}_i$ was in Row $\bar{4}$, $\bar{x}_i \vee \bar{y}_i$ is formed ($\bar{p}_i$). (Note: $p$ and $q$ designations are arbitrarily assigned: see FIG. 2).

(3) Read: $\bar{p}_i$ (Row 4) to $U_i$.
Write: $U_i$ to Row $\bar{4}$. Row 4 now contains $\bar{\bar{p}}_i$ or $p_i$ (4) Read: $\bar{q}_i$ (Row 3) to $U_i$.
Write: $U_i$ to Row $\bar{5}$. Row 5 now contains $\bar{\bar{q}}_i$ or $q_i$.

Note that the partial or intermediate values $q_i$ and $p_i$ are now formed and stored in the memory. For simplicity the read write dichotomy format will be dispensed with where obvious in the remaining discussion of the operation of the remaining clock cycles.

(5) $q_i$ transferred from Row 5 to Rows 3 and 6.

(6) $p_i$ transferred from Row 4 to Row 3.
Row 3 now contains $p_i \vee q_i$ or $\bar{r}_i$.

(7) Read: $q_i$ from Row 6 to $v_i$. $v_i$ now contains $q_i$, whereas $U_i$ still has $p_i$ therein. At this point, the logic circuit is now primed to generate the carry signal for the next successive logic stage, whereas the carry signal from the last successive logic stage is available for use. These operations are assumed to absorb the write cycle time of pulse 7 and read time of pulse 8.

(8) Write: carry $c_{i-1}$ into Row 7 and $\bar{c}_{i-1}$ to Row 8.

(9) $\bar{r}_i$ transferred from Row 3 to Row 7 and Row $\bar{8}$, Row 7 now contains $\bar{r}_i \vee c_{i-1}$, Row 8 now contains $\bar{\bar{r}}_i \vee \bar{c}_{i-1}$ or $r_i \vee \bar{c}_{i-1}$.

(10) $\bar{r}_i \vee c_{i-1}$ transferred from Row 7 to Row $\bar{3}$, Row 3 now contains $\overline{(\bar{r}_i \vee c_{i-1})}$ or $r_i \bar{c}_{i-1}$.

(11) $r_i \vee \bar{c}_{i-1}$ transferred from Row 8 to Row $\bar{3}$, Row 3 now contains $r_i \bar{c}_{i-1} \vee \overline{(r_i \vee \bar{c}_{i-1})}$ or $r_i \bar{c}_{i-1} \vee \bar{r}_i c_{i-1}$, or $s_i$, the final arithmetic summation.

It has previously been stated hereinbefore that the signals $c_{i,i+1}$ and $\bar{c}_{i,i+1}$ formed sequentially in the peripheral equipment for the columns need not necessarily have the significance of the carry in an addition or subtraction. In fact, there are logical processes which need not have arithmetic significance but may be decomposed, as the addition and the subtraction, into a part which may be carried out simultaneously and a part which may be carried out sequentially, or which even do not contain a part which may be carried out simultaneously.

An example of such a process is the determination of the parity of the number of digits 1 of a number. When the signals $x_i$ are stored in the flip-flops $U_i$ as well as in the flip-flops $V_i$ it is found that at each digit position for which $x_i=1$, the following formula is fulfilled:

$$c_{i,i+1} = \bar{c}_{i-1,i}, \quad \bar{c}_{i,i+1} = c_{i-1,i}$$

and that at the digit positions for which $x_i=0$, there is fulfilled the formula:

$$c_{i,i+1} = c_{i-1,i}, \quad \bar{c}_{i,i+1} = \bar{c}_{i-1,i}$$

These results, which may be readily deduced from the circuit shown in FIGURE 3, are summarized in the table of FIGURE 6. This may be expressed by saying that the signal $c_{i-1,i}$ is complemented when passing a digit position for which $x_i=1$, but is not complemented when passing a digit position for which $x_i=0$. So the fact whether the signal formed at the latter digit position is complemented or not with respect to the signal introduced at the first digit position is an indication of whether the relevant number comprises an odd or an even number of digits 1.

In the described example of the addition only the logical operations "not" and "or" are established in the storage matrix and the logical operation "and" is reduced to these two. The whole may, of course be so designed that other primitive logical operations can be performed directly in the storage matrix in the manner described in the patent repeatedly referred to. This makes the wiring thereof a little more complicated but may give the machine a higher speed because fewer clock pulse cycles are then required for an addition or a subtraction.

It is noted that the invention is also applicable to computers calculating in a system other than the binary system. In a computer calculating in the decimal system, in which the so-called "excess-three code" is used, this may take place almost without modifications since this code is a disguised binary code. When using other codes, however several unessential and evident modifications are necessary.

It is also pointed out that, under certain conditions, it is possible to simplify the circuit shown in FIGURE 3 by omitting the flip-flop $V_i$ and connecting the upper inlet of the and-gate $A_{2i}$ to the left-hand outlet of the flip-flop $U_i$. In this case, however, only the signals of the form $u_i\bar{c}_{i-1,i}\bar{u}_ic_{i-1,i}$ can be formed, thus reducing the possibilities of the circuit.

It is further noted that each of the gates $G_{1i}$ and $G_{2i}$ can be doubled so that a signal received from the storage matrix can be written in the flip-flop $U_i$ or $V_i$ in uncomplemented or complemented form. With the present state of the art, however, it is more advantageous to use for this purpose a few additional rows of the storage matrix as above described.

What is claimed is:

1. An arrangement for forming digital summations from sum and carry component signals and comprising a multidigit storage matrix having a plurality of rows of storage elements for the retention of a plurality of digits arranged in a sequentially ordered multidigit array, and a plurality of information transfer control means, each associated with one digit order of said multi-order sequence and connected to said matrix, each said control means comprising a temporary bistable storage means, a multi-input logic circuit for forming an intermediate signal representative of said sum and carry component signals, first switching means connecting said matrix to the input of said bistable storage means for forming said sum component signal, second switching means connecting the output of said logic circuit to said matrix, means connecting one input of said logic circuit to the output of said bistable storage means for receiving said sum component signal, means connecting another input of said logic circuit to the output of the preceding logic circuit associated with the last digit order position in descending order of significance for receiving said carry component signal, third switching means connecting the output of said logic circuit to an input of the succeeding logic circuit associated with the next digit order position in ascending order of significance for supplying thereto the next digit order carry component signal, means successively applying control signals to said first, second and third switching means respectively to initiate and maintain information transfer to and from said matrix through each said control means in a predetermined sequence to form said sum component signal for one order digit and said carry component signal for the next order digit in ascending order of significance.

2. A computer for performing an arithmetic operation between first and second binary coded digits and comprising a multidigit storage matrix having a plurality of rows of storage elements for retention of a plurality of digits arranged in a sequentially ordered multidigit array, and a plurality of information transfer control means, each associated with one digit order of said multiorder sequence and connected to said matrix, each said control means comprising first and second bistable storage means and a multi-input logic circuit, said first bistable storage means storing a signal $u_i$ and said second bistable storage means storing a signal $v_i$, wherein $i$ represents the relative order position of respective ones of said first and second digits, first switching means connecting an output of each of said first and second bistable storage means to said matrix, second switching means connecting the output of said logic circuit to said matrix, means connecting respective inputs of said logic circuit to respective outputs of ceding logic circuit associated with the preceding digit order position in descending order of significance, third switching means connecting the output of said multi-input logic circuit to an input of the succeeding logic circuit associated with the next digit order position in ascending order of significance, means applying control pulses to said first, second and third switching means to initiate and maintain information transfer to and from select rows of said matrix through each said control means over a predetermined period and in a predetermined sequence to form a first component signal for one order digit $i$, said logic circuit including sum and product gates arranged to be responsive to the said applied inputs to form a second arithmetic component signal for the digit order $i+1$ of the form $$u_i\bar{c}_{i-1,i}\vee\bar{v}_ic_{i-1,i}$$

wherein;

$u_i$ is the output of said first bistable storage means, $c_{i-1,i}$ is the complemented output of said preceding digit logic circuit in descending order of significance, $v_i$ is the complemented output of said second bistable storage means, and $c_{i-1,i}$ is the output of said preceding digit logic circuit in descending order of significance, means applying the output of said next most significant digit logic circuit in descending order to said matrix during said predetermined period to complete the said arithmetic addition in the signal form, and means connecting the output of said multi-stage logic circuit to the input of the logic circuit in the next higher digit position stage in ascending order of significance, and means applying the second arithmetic component signal associated with the logic circuit of the preceding digit $i-1$ in descending order of significance and the said first arithmetic component signal associated with the order $i$ to said matrix to complete said arithmetic operation.

3. The combination of claim 2 wherein said data signal represents the resultant of an arithmetic summing operation and said first and second component signals represent sum and carry signals respectively.

4. A computer for performing an arithmetic addition between first and second multidigit binary coded numbers $x$ and $y$ and comprising a multidigit capacity storage matrix having a plurality of rows of storage elements for the retention of a plurality of digits arranged in a sequentially ordered multi-digit array and information transfer control means connected to said matrix, said control means comprising first and second bistable flip-flops and a present stage multi-input logic gate including an OR gate and a pair of AND gates having first and second respective outputs connected to the inputs of said OR gate, said AND gates being connected to the output and complementary output respectively of said first and second flip-flops, switching means connecting the inputs of said flip-flops to said matrix, means for applying control signals to said switching means to initiate and maintain information transfer to and from said matrix through said first and second bistable means over a predetermined period and in a predetermined sequence until the signals $r_i$ and $\bar{r}_i$ are formed in said matrix wherein $r_i=x_iy_i\vee x_iy_i$ and $\bar{r}=x_iy_i\vee\bar{x}_i\bar{y}_i$, and the signals $p_i$ and $q_i$ are formed in said first and second flip-flops respectively, wherein $p_i=x_iy_i$ and $q_i = \bar{x}_i \bar{y}_i$, means respectively connecting further inputs of said AND gates to the logic circuit output, and the complement thereof, associated with the preceding bit position in descending order of significance, said logic circuit responsive to all of said inputs to form the signal $$c_{i,i+1} = p_i \bar{c}_{i-1} \vee \bar{q}_i c_{i-1,i}$$

wherein

- $c_{i,i+1}$ is the computed carry digit for the addition computation in the next higher digit position in ascending order,
- $p_i$ is the output of said first flip-flop and represents $x_i y_i$,
- $\bar{c}_{i-1,i}$ is the complemented output of said preceding digit logic circiut in descending order
- $\bar{q}_i$ is the complemented output of said second flip-flop and represents $x_i \vee y_i$, and
- $c_{i-1,i}$ is the output of the said preceding digit logic circuit in descending order, means applying the output of said next most significant digit logic circuit in descending order to said matrix during said predetermined period to compute the said arithmetic addition in the signal form $$s_i = r_i \bar{c}_{i-1,i} \vee \bar{r}_i c_{i-1,i}$$

wherein $s_i$ is the final arithmetic summation, and means connecting the output $c_{i,i+1}$ of the present stage logic circuit to the input of the logic circuit in the succeeding digit position stage in ascending order of significance.

References Cited

UNITED STATES PATENTS

| | | | |
|---|---|---|---|
| 3,166,669 | 1/1965 | Cochrane | 235—175 |
| 3,202,806 | 8/1965 | Menne | 235—175 |
| 3,234,371 | 2/1966 | Osofsky | 235—175 |

MALCOLM A. MORRISON, *Primary Examiner.*

I. J. FAIBISCH, V. SIBER, *Assistant Examiners.*

UNITED STATES PATENT OFFICE
CERTIFICATE OF CORRECTION

Patent No. 3,369,110 February 13, 1968

Herman Jacob Heijn

It is certified that error appears in the above identified patent and that said Letters Patent are hereby corrected as shown below:

Column 8, line 5, "output" should read -- input --; line 10, "ceding" should read -- each of said bistable means and to the output of the preceding --; line 30, "$c_{i-1,i}$" should read -- $\bar{c}_{i-1,i}$ --; line 32, "$v_i$" should read -- $\bar{v}_i$ --; line 73, "$r_i=x_iy_iVx_iy_i$" should read -- $r_i=x_i\bar{y}_iV\bar{x}_iy_i$ --.

Column 9, line 15, "circiut" should read -- circuit --.

Signed and sealed this 6th day of January 1970.

(SEAL)
Attest:

EDWARD M.FLETCHER,JR.
Attesting Officer

WILLIAM E. SCHUYLER, JR.
Commissioner of Patents